United States Patent [19]

Suggitt et al.

[11] 4,066,699
[45] Jan. 3, 1978

[54] PROCESS FOR THE HYDROGENATION OF NITRATED PARAFFINS USING A PALLADIUM ON CARBON CATALYST CHARACTERIZED BY A LOW ASH AND A LOW HALIDE CONTENT

[75] Inventors: Robert M. Suggitt, Wappingers Falls; Joseph H. Coone, Jr., Fishkill; Walter C. Gates, Jr., Newburgh, all of N.Y.

[73] Assignee: Texaco Inc., New York, N.Y.

[21] Appl. No.: 754,378

[22] Filed: Dec. 27, 1976

[51] Int. Cl.$^2$ .................. C07C 85/11; B01J 21/18
[52] U.S. Cl. .................. 260/583 R; 252/444; 252/447; 260/534 R; 260/534 M; 260/580; 260/583 H; 260/583 P; 260/583 M; 260/584 R; 260/566 A; 260/644; 260/689; 423/461
[58] Field of Search .................. 252/447, 444; 260/583 P, 583 R, 583 M, 584 R; 423/461

[56] References Cited

U.S. PATENT DOCUMENTS

| 2,823,235 | 2/1958 | Graham et al. | 260/580 |
|---|---|---|---|
| 3,736,265 | 5/1973 | Suggitt | 252/445 |
| 3,736,266 | 5/1973 | Schrage | 252/447 |
| 3,737,460 | 6/1973 | Suggitt | 260/583 M |
| 3,739,027 | 6/1973 | Gates | 260/583 M |
| 3,923,893 | 12/1975 | Gates et al. | 260/583 M |
| 3,960,964 | 6/1976 | Suggitt et al. | 260/583 M |
| 3,974,227 | 8/1976 | Berthoux et al. | 252/447 X |
| 4,014,817 | 3/1977 | Johnson et al. | 252/445 |

FOREIGN PATENT DOCUMENTS

| 923,681 | 4/1973 | Canada | 423/461 |
|---|---|---|---|
| 1,108,671 | 6/1961 | Germany | 252/444 |
| 285,386 | 10/1928 | United Kingdom | 252/444 |

Primary Examiner—Robert V. Hines
Assistant Examiner—John J. Doll
Attorney, Agent, or Firm—Thomas H. Whaley; Carl G. Ries; Carl G. Seutter

[57] ABSTRACT

Nitrated hydrocarbons, such as nitroparaffins, are reduced to amines by use of palladium on a carbon catalyst characterized by low ash and low halide.

14 Claims, No Drawings

PROCESS FOR THE HYDROGENATION OF NITRATED PARAFFINS USING A PALLADIUM ON CARBON CATALYST CHARACTERIZED BY A LOW ASH AND A LOW HALIDE CONTENT

FIELD OF THE INVENTION

This invention relates to hydrogenation. More particularly it relates to the production of amines from nitrated hydrocarbons.

BACKGROUND OF THE INVENTION

As is well known to those skilled in the art, it is possible to hydrogenate nitrated hydrocarbons, such as nitroparaffins, to form amines. It has been found that the catalysts which may be employed in this reaction are particularly characterized by disadvantages which render them less than fully satisfactory. Among these disadvantages may be noted the undesirably low crush strength of the catalyst pellets which results in catalyst breakage and spalling with attendant blockage of the reactor catalyst bed. Other disadvantages may be a result of the undesirable high ash content of the catalyst which makes it difficult to fabricate a catalyst of consistent properties; and the ash components may induce unwanted side reactions. Another disadvantage of prior art catalysts is the undesirably high content of halides, which in the presence of hydrogen or water form gases which are highly corrosive to the stainless steel equipment used. The resultant pitting considerably shortens the equipment life.

In practice it is found that if one attempts to correct one of these disadvantages, improvement may be achieved but only at the expense of another feature. For example the attempt to decrease the ash content may substantially decrease the catalyst strength—or vice versa. An attempt to produce a cheaper catalyst may yield one which does not have requisite selectivity, etc.

It is an object of this invention to provide a method of preparing amines. Other objects will be apparent to those skilled in the art.

STATEMENT OF THE INVENTION

In accordance with certain of its aspects, the novel method of this invention for preparing an amine by hydrogenating a corresponding charge nitrated hydrocarbon may comprise hydrogenating said charge at hydrogenation conditions including hydrogenation temperature of 100°–450° F in the presence of, as catalyst, a pelletted carbon having an ash content of less than about 0.1% and a halide content of less than about 0.5% and bearing 0.2–5% of palladium deposited thereon thereby forming a product stream containing hydrogenated product; and recovering said product stream containing said hydrogenated product.

DESCRIPTION OF THE INVENTION

Charge nitrated hydrocarbons which may be treated by the process of this invention include: (i) nitroparaffins; (ii) oximes; (iii) nitro-olefins; (iv) nitroketones; (v) nitro-alcohols; (vi) nitronitrates of alcohols; (vii) nitronitrates of paraffins; etc.

The preferred charge compositions may include nitro-paraffins - mono - or poly-, preferably mono-nitroparaffins. The paraffin group may be a secondary or a tertiary hydrocarbon group. The composition may, for example be a long chain hydrocarbon which has been nitrated and which thus bears several —$NO_2$ at positions along the chain.

The charge nitrated hydrocarbon may contain groups in addition to nitrogen-containing groups—e.g. hydroxy groups, ketone groups, aldehyde groups, carboxyl groups, etc.

The paraffin may be a $C_6$ to $C_{25}$, preferably straight chain paraffin which in one embodiment may principally contain $C_{10}$ to $C_{14}$ components.

When the charge composition is a nitroparaffin (which is to be hydrogenated to an amine), it may typically contain:

TABLE nitro propane
nitropentane
nitro hexane
nitro heptane
nitro octane
nitro nonane
nitro decane
nitro dodecane
nitro tri-decane
nitro tetradecane
nitro octradecane Although it may be possible to hydrogenate terminally substituted compounds such as 1-nitro dodecane to 1-amino dodecane, it is preferred to use as charge non-terminally substituted compounds such as a 2, 3, 4, 5, or 6-nitro dodecane.

When the charge composition is an oxime (which is to be hydrogenated to an amine), it may illustratively contain:

TABLE dodecanone-2- oxime
dodecanone-3- oxime
decananone-4- oxime
octanone-3- oxime
octanone-3,4-di-oxime It should be noted that the oximes are nomenclated on the basis of the ketone or aldehyde from which they have classically been derived.

When the charge nitrated hydrocarbon is a nitro-olefin (which is to be hydrogenated to an amino-paraffin), it may illustratively include:

TABLE 2-nitro-octene-4
3-nitro-dodecene-5

When the charge nitrated hydrocarbon is a nitroketone (which is to be hydrogenated to an amino ketone), it may illustratively include:

TABLE 2-nitro-dodecanone-4
2-nitro-dodecanone-5
2,3-dinitro-dodecanone-5
3-nitro-decanone-4
1-nitro-octanone-3

When the charge nitrated hydrocarbon is a nitroalcohol (which is to be hydrogenated to an aminoalcohol), it may illustratively include:

TABLE 2-nitro-hexanol-1
5-nitro-hexanol-1
3-nitro-2-ethylhexanol-1

3-nitro-dodecanol-1
4-nitro-tetradecanol-1
3,4-dinitro-tetradecanol-1 When the charge nitrated hydrocarbon is a nitro-nitrate of an alcohol (which is to be hydrogenated to an amino-alcohol), it may be illustratively include:

TABLE 2-nitronitrate of hexanol-1
3-nitronitrate of decanol-1
4-nitronitrate of tetradecanol-1

When the charge nitrated hydrocarbon is a nitro-nitrate of a paraffin (which is to be hydrogenated to an amino-paraffin), it may illustratively include:

TABLE 4-nitronitrate of 2-ethylhexane
3-nitronitrate of dodecane

In a typical embodiment, the charge nitrated hydrocarbon may be prepared by subjecting a charge hydrocarbon such as n-hexane, n-dodecane, or a commercial mixture of $C_6$–$C_{25}$ straight chain paraffins or of $C_{10}$–$C_{14}$ straight chain paraffins to liquid phase nitration in the presence of a vigorous nitrating agent (such as nitrogen dioxide or nitric acid) at e.g., 250°–500° F and 1–20 atmospheres. Depending on the ratio of nitrating agent to charge hydrocarbon, the product may bear one, or more commonly several, nitrogen-containing groups along the chain—usually randomly positioned along the chain and usually not on the terminal carbon atom.

In addition to containing different hydrocarbon chains because of the components of the typical charge mixture, the charge nitrated hydrocarbon may also contain components having a varying number of nitrogen groups along the chain (as nitro-groups, oxime groups, nitronitrate groups, etc.) and also other groups formed during the course of the oxidative reaction e.g., alcohol groups, double bonds, etc.

Commonly the charge may be a commercially available or commercially prepared mixture identified only as e.g., (i) a nitrated $C_{10}$–$C_{14}$ paraffin, (ii) a nitrated $C_6$–$C_{25}$ paraffin, etc.

Hydrogenation of the charge nitrated hydrocarbon in practice of the process of this invention may be effected catalytically at hydrogenating temperatures and hydrogenating pressures. Typical values may be as set forth in the following Table which sets forth inlet temperature, average pressures, and LHSV based upon the empty reactor. The reaction is exothermic and preferably the temperature should not be permitted to rise above about 450° F.

TABLE

| | Broad Range | Preferred Range | Typical |
|---|---|---|---|
| Temperature | 100° F–450° F | 200° F–300° F | 250° F |
| Pressure | 10–300 atm | 20–40 atm | 30 atm |
| LHSV | 0.2–20 | 2–10 | 5 |
| Moles H$_2$ per mole of nitrated Hydrogen charge | 4–200 | 6–20 | 10 |

The preferred catalyst which may be used in practice of the process of this invention may be a pelletted carbon having an ash content of less than about 0.1% and a halide content of less than about 0.5% and bearing 0.2–5% of palladium.

This catalyst may be prepared from a commercially available pelletted carbon having an ash content of 0.1–20% or more, more commonly 2–10% or perhaps 7–8%, say 7.7%. Although on occasion it may be possible that the charge pelletted carbon may have an ash content as low as approaching 0.1%, it is more typical to find ash contents at the 7–8% level.

The high ash carbons in the form of pellets which may be treated by the process of this invention may typically be characterized by their total ash content of up to 20%, typically 0.1–15%, say 7–8%, by their SiO$_2$ content of 2–10%, typically 5.4–7.7%, say 6.5%, and by their crush strength (after drying overnight at 300° F) of 10–25, typically 15–25, say 22 pounds (corresponding to 0.8–4, typically 1–6, say 3.1 pounds per millimeter length)—when measured on a typical cylindrical pellet having a diameter of 3mm, a length of ca 7mm, and a density of 0.43–0.47 g/cc. Suitable pellets having a typical cylindrical pellet diameter of 1.5mm, may have a crush strength of 1–1.5 lb per mm.

Illustrative commercially available charge carbon pellets which may be employed may include those sold by American Norit Co. under the trademark Norit R 3230 of irregular shape having an average diameter of about 3mm, apparent density of about 0.47 g/cc, non-volatile ash of about 4.3% (after calcination), silica content of about 2.15%, and a crush strength of about 3.1 pounds per millimeter of length.

In practice of the process of this invention, the high ash pelletted carbon is first contacted with a hydrohalic acid, preferably in aqueous solution. It may be possible to use (i) aqueous hydrochloric acid, (ii) aqueous hydrobromic acid, (iii) aqueous hydrofluoric acid, (iv) aqueous hydroiodic acid, or (v) an aqueous mixture of two or more hydrohalic acids e.g., of hydrochloric acid and hydrofluoric acid, etc.; it is however highly preferred that in the first leaching operation, the agent be aqueous hydrochloric acid. It is also preferred that leaching with aqueous hydrochloric acid be followed by leaching with aqueous hydrofluoric acid—prior to further treating in practice of the process of this invention.

In practice of the process of this invention in accordance with certain of its preferred aspects, the high ash, pelletted carbon charge (typically having say 7.7% ash) is first leached with hydrochloric acid in a first leaching operation. Preferably the acid may be 3–35%, typically 10–25%, say 20% aqueous hydrochloric acid. Leaching may be effected by use of acid in total amount, in one or more stages, of 0.1–10, preferably 0.5–3, say 1 times the weight of carbon charge in each stage. Leaching with hydrochloric acid may typically be effected for 1–144 hours, preferably 8–96 hours, say 72 hours at 100°–250° F, typically 130°–140° F, say 135° F at 0–500 psig, typically 0–100 psig, say 0 psig. (The solution used in the leaching operations may consist essentially of aqueous hydrochloric acid and be essentially free of other components including other acids such as hydrofluoric acid, nitric acid, sulfuric acid, etc.).

Preferably the carbon is water washed with an excess of water after each leaching with hydrochloric acid.

Optionally the carbon pellets may be acid washed in at least one additional stage using hydrochloric acid under preferably the same conditions as those used in the first washing. At the conclusion of the wash with hydrochloric acid, the ash content may typically be 1–15%, preferably 1–10% say 1.3%, and the ash will contain mostly silica with only minor amounts of iron, phosphate, magnesium, and calcium. The silica content may be typically 1–9%, preferably 1–6%, say about 1.1%. The typical strength (pounds per mm length) may be 0.8-6, commonly 1-4, say 3.1. The wash with hydrochloric acid will have removed most of the non-silica ash constituents. The crush strength will be substantially the same as that of the charge.

The reduced ash carbon as so prepared may in accordance with the preferred aspect of this invention be leached with hydrofluoric acid. Preferably the acid may be 2-50%, typically 5-30% say 10% aqueous hydrofluoric acid. Leaching may be effected by use of acid in total amount, in one or more stages, of 0.02-10, preferably 0.1-1, say 0.2 times the weight of carbon charge in each stage. Leaching with hydrofluoric acid may typically be effected for 1-144 hours, preferably 8-72 hours, say 48 hours at 100°-210° F, typically 130°-140° F, say 135° F at 0-500 psig, typically 0-100 psig, say 0 psig. The preferred leaching solution in this second leaching operation may consist essentially of aqueous hydrofluoric acid and be essentially free of other components including other acids such as hydrochloric acid, nitric acid, sulfuric acid, etc.

In one preferred embodiment, the leaching with hydrochloric acid and the leaching with hydrofluoric acid may each be separately carried out in a single separate step. In another preferred embodiment, each of the leachings may be carried out in several steps. Thus the charge high ash carbon may be leached 2-5 times with hydrochloric acid to yield the reduced ash carbon and then subsequently leached 2-5 times with hydrofluoric acid. Preferably one or more water washed may follow each of the acid washes.

The HF-washed pelletted carbon may contain less than 0.2% total ash, commonly 0.05-0.1%. The silica content is of the same order of magnitude i.e. less than 0.2%; commonly 0.05-0.1%. The ash may typically consist essentially of silica. The halide ion content is 0.1-5%, say 0.4%. The strength (pounds per mm of length) may be 0.8-6, commonly 1-6, say 3.1.

At the conclusion of the leaching with hydrohalic acid, it is preferred that the low ash carbon be treated to lower the halide from its value of 0.1-5%, preferably 0.1-2%, say 0.40% to a final value of 0.01-0.5%, preferably 0.01-0.2%, say 0.03%.

This may preferably be effected by leaching with an organic acid and preferably a water-soluble organic carboxylic acid such as acetic acid, propionic acid, formic acid, butyric acid (the latter being less preferred because of lower solubility and higher boiling point), etc. The preferred acid is acetic acid in 1-50%, preferably 10-30%, say 20% aqueous solution.

Lowering of the halide may also be effected by leaching with an ammonium salt of an organic acid, preferably a carboxylic acid. The ammonium salts may include quaternary ammonium salts. Illustrative ammonium salts may include:

ammonium benzoate
ammonium formate
ammonium acetate
ammonium carbamate
ammonium lactate
ammonium citrate
ammonium oxalate
ammonium propionate
ammonium salicylate
ammonium succinate
ammonium tartrate
ammonium valerate It should be noted that carbamic acid or carbonic acid is used in the form of their ammonium salts. (not as the free acids).

Illustrative quaternary ammonium salts may include:
tetramethyl ammonium acetate
benzyl, trimethyl ammonium acetate
tetramethyl ammonium formate
tetra-ethyl ammonium citrate etc.

Treatment with the acetic acid, in the preferred embodiment, may be effected by contacting the low ash carbon with 0.5-50 times, preferably 1-10, say about five times its weight of acetic acid for 0.5-48, preferably 1-10, say 5 hours at 60°-200° F, preferably 130°-140° F, say 135° F and 0-500 psig, preferably 0-100 psig, say 0 psig. Leaching with acetic acid may be effected in one or more steps to yield a low ash carbon containing reduced halide values.

At the conclusion of the wash with the preferred 20% acetic acid, the ash content of the low ash carbon may be typically less than 0.1 wt %.

The acetic acid treatment can lower the ash content of the raw ash carbon by displacing sorbed metal ions from the surface of the carbon. The amount of sorbed metal removed is dependent on the thoroughness of previous washings including hydrohalic acid and water washings. For example, an acid treated carbon with a residual ash content of 0.1-0.2%, say 0.11% after thorough water washing may have the ash content lowered to less than 0.1%, say 0.06% by treatment with ammonium carbamate. Removal of solubilized, sorbed metals from the surface by treatment with ammonium carbamate also lowers the halide content. While much of the halide sorbed in the carbon is in the hydrohalic acid form and thereby easily removed on heating, a portion of the halide remains as metal salt. Displacement of the metal ions from the carbon surface thereby reduces the retained halide content.

On heating a hydrohalic acid-washed catalyst containing sorbed halide, the hydrogen halide and water released can be highly corrosive to the stainless steels that are resistant to nitroparaffins.

The halide content after acetic acid washing is preferably less than 0.5%; and it may be 0.01-0.5%, preferably 0.01-0.2%, say 0.03%. The strength of the pellet is typically unaffected by acetic acid treating. The crush strength of the pellets is commonly substantially the same as it was prior to treating with hydrochloric acid.

The preferred of these materials may be ammonium acetate and more preferably acetic acid—in aqueous solution.

The carbon pellets may be (i) dried at 100°-1000° F, preferably 180°-300° F, say 230° F for 2-24 hours, preferably 6-10 hours, say 8 hours (ii) calcined as in nitrogen at 800°-1000° F, say 900° F for 6-10 hours, say 8 hours, and (iii) then cooled to ambient temperature of 50°-100° F, preferably 65°-90° F, say 70° F.

It is a particular feature of the carbon so prepared that it is of controlled composition which is normally constant and which is particularly characterized inter alia by its controlled low ash content and its controlled low content of fixed, non-volatile halides such as sodium chloride, calcium chloride, magnesium chloride, etc.

In practice of the preferred aspect of this invention, a catalyst composition particularly characterized by its ability to efficiently catalyze hydrogenation reactions may be prepared by depositing palladium onto a pelletted carbon catalyst support having preferably a halide content of less than about 0.5% and an ash content of less than about 0.1% of non-volatile ash. The preferred low ash carbon which may be employed may be that prepared by the process disclosed supra.

In accordance with this aspect of the invention, the catalyst may be prepared by impregnating the carbon, preferably in the form of low halide low ash pellets, with (typically by immersion in) a solution of palladium.

Palladium may be impregnated by use of a solution of the nitrate salt—the solution containing 0.2-50 parts, preferably 0.6-20, say 1 part of palladium per 1000 parts of total solution. Although it is possible to introduce palladium from a solution of e.g., palladium chloride, this is normally a less preferred mode of proceeding as it introduces halide. When the support is characterized by almost substantial freedom from halide and the level of palladium chloride to be used is very low, then it may be possible to use the chloride solution; but clearly this is a less preferred embodiment.

The catalyst support may remain in contact with the palladium solution for 1-24 hours, preferably 1-8 hours, say 1.5 hours at 50°-122° F, preferably 68°-86° F, say 77° F. The support particles which adsorb solution during this period may be separated and dried at 200°-400° F, preferably 220°-360° F, say 300° F for 4-24 hours, preferably 6-10 hours, say 8 hours in a non-oxidizing atmosphere such as nitrogen. The catalyst particles may be calcined at 700°-1200° F, preferably 800°-1000° F, say 900° F, for 1-4 hours, preferably 2-3 hours, say 1 hour in an inert atmosphere such as nitrogen or hydrogen.

The loaded catalyst composition so-prepared may thus comprise a catalyst support having an ash content of less than about 0.1% of non-volatile ash; and palladium supported thereon.

The preferred palladium catalyst compositions of this invention may contain palladium in amount of 0.2-5%, say 1%.

Illustrative of the product catalysts so prepared may be a. a wood derived carbon pellet (originally containing 7.7% total ash and 5% silica) treated by the process of this invention to yield a carbon containing about 0.03% halide, less than 0.1% total ash, and less than 0.05% silica on which has been deposited 1.09% palladium (crush strength of ca 3.1 #/mm length and halogen content of about 0.1%);

b. a bone derived carbon pellet (originally containing 15% total ash and 5% silica) treated by the process of this invention to yield a carbon containing about 0.5% halide, 0.07% total ash, and ca 0.04% silica on which has been deposited 0.85% palladium (crush strength of ca 2.6 #/mm length and halogen content of about 0.01%);

c. a petroleum (from petroleum coke) derived carbon pellet (originially containing 2.5% total ash and 0.5% silica) treated by the process of this invention to yield a carbon containing 0.01% halide, 0.1% total ash, and 0.10% silica on which has been deposited about 1% palladium (crush strength of ca 3.5 #/mm length and halogen content of about 0.03%).

In practice of the hydrogenation process of this invention, it is commonly found that the initial lined-out conversion may be 30-100%, preferably 80-100%, say 99%. The selectivity (of e.g. charge nitroparaffin to product primary amine) may be 60-100%, preferably 88-100%, say 93%.

It may be desirable to carry out hydrogenation in the presence of inert hydrocarbon diluent such as the hydrocarbon which was nitrated to form the nitrated hydrocarbon charge. Typically the diluent may be (i) a $C_6$-$C_{25}$ paraffin, (ii) a $C_{10}$-$C_{14}$ paraffin, etc.

A typical charge to hydrogenation may include a crude nitrated product which has been caustic washed and water washed to yield a composition containing nitrated hydrocarbons, unreacted hydrocarbons, etc.; and in this instance, the latter may serve as diluent.

Hydrogenation product containing e.g., $C_6$-$C_{25}$ amines may be recovered by condensing the vapors exiting the reaction and separating the condensate from the non-condensibles. The condensate may be separated into its component parts by distillation. Alternatively separation may be effected by extraction of condensate with aqueous acid such as hydrochloric acid, to form a solution of the amine salt. The amine se may then be recovered as by neutralizing the amine salt with base (e.g. sodium hydroxide) to liberate free amine, followed by distillation and then preferably by drying.

When the charge nitrated hydrocarbon contains functionality in addition to the nitrogen-containing groups, it should be noted that other reactions may occur. Thus carbon-to-carbon double bonds are typically saturated to a carbon-to-carbon single bond, ketones may be reduced to alcohols, etc. Alcohols may be essentially inert and only the nitro-function is modified.

DESCRIPTION OF THE PREFERRED EMBODIMENT

Practice of the process of this invention may be apparent to those skilled in the art from the following wherein, as elsewhere in this specification, all parts are parts by weight unless otherwise specified

EXAMPLE I

In this example which represents practice of a preferred embodiment of this invention, the catalyst is prepared from commercially available activated carbon pellets sold by American Norit Co. under the trademark Norit R 3230. These pellets are of irregular shape of about 3mm average diameter, average apparent density of about 0.47 g/cc. After calcination, 4.3% non-volatile ash remained which contained,

TABLE

| Component | % |
|---|---|
| $Na_2O$ | 5 |
| $MgO$ | 20 |
| $CaO$ | 10 |
| $Al_2O_3$ | 10 |
| $Fe_2O_3$ | 1 |
| $PO_4$ | 3.5 |
| $SiO_2$ | 50 |
| $TiO_2$ | 0.5 |

The crush strength is 3.1 pounds per millimeter of length (i.e. average diameter in this case).

Carbon pellets are subjected to leaching by immersion in an excess of 6N aqueous hydrochloric acid at 130°-140° F for 72 hours. The acid is drained and the carbon is water-washed until the wash water is chloride free. The pellets are then washed twice, each time with an excess of 10% aqueous hydrogen fluoride for 72 hours at 130°-140° F. They are then contacted with an excess of 20% acetic acid for 72 hours at 130°-140° F and this is repeated twice more. Water washing is employed between the acetic acid washings. After a final water washing, the carbon pellets are found to have a chloride content of 280 ppm i.e. 0.028% and a fluoride content of 0.027%. The crush strength of the particles is the same as prior to treating—ca 3.1 pounds per millimeter of length. The final ash content is 0.10%. The carbon is then dried at 900° F for 2 hours in a stream of nitrogen.

The low ash, low halide carbon pellet is then submerged for 24 hours at 130°–140° F in aqueous solution of palladium nitrate. After the excess solution is poured off, the catalyst mass is dried at 212° F and then heated in a stream of hydrogen for 24 hours at 700° F. Prior to use, the catalyst is heat-treated by heating for 6 hours at 1000° F in a stream of nitrogen. The catalyst contains 1.07% palladium.

Charge is nitrated hydrocarbon, prepared by nitrating a $C_{10}$–$C_{14}$ normal paraffin feedstock at 400° F and 1 atmosphere pressure with nitrogen dioxide. Reaction in liquid state yields product containing 14.6 parts mononitrated n-paraffin, 2.9 parts dinitrated n-paraffin, 0.4 parts ketone, and 82.1 parts n-paraffin.

This charge composition is introduced into the catalyst bed together with hydrogen. Reaction is in mixed vapor-liquid phase.

Reaction effluent is passed through a condenser. The condensate is recovered. Analysis of the product indicates that it contains primary mono-amines of secondary straight chain hydrocarbons; primary, polyamines of secondary straight chain hydrocarbons; unreacted n-paraffins (diluent); and unreacted nitrated hydrocarbon charge materials.

Work-up may include contacting the condensate with an excess of aqueous hydrochloric acid at 50° F (twice). The aqueous extract includes only the amine hydrochlorides. Contact with concentrated aqueous solution of caustic soda liberates free amine which may be separated and dried over anhydrous caustic soda. Further treating may include drying over sodium metal.

EXAMPLE II

In this experimental example, the procedure of Example I is followed, except that the carbon is dried at 300° F in the stream of nitrogen, The total ash is 0.09%, chloride is 30 ppm, and fluoride is 0.028% or 280 ppm.

EXAMPLE III

In this control example, the procedure of Example I is followed except that (i) the contact with HCl is for 4 days rather than 3, and (ii) the hydrofluoric acid and acetic acid washings were omitted. The sample is dried at 300° F. Total ash is 5.32% and chloride is 0.32%.

Each of Examples I–III is run in duplicate series. In a first series, designated "A" in the table which follows, the temperature is 250°–300° F at pressure of 500 psig and the LHSV is 1.4 In the second series, designated "B" in the table, the temperature is 300°–350° F and the LHSV is 3.0.

The analyses are reported as milligrams of desired primary amine —$NH_2$ per gram of total amine product and as milligrams of less desired secondary amine —NH— per gram of total amine product.

TABLE

|  | A | | | B | | |
|---|---|---|---|---|---|---|
| EXAMPLE | —$NH_2$ | —NH— | Sel. | —$NH_2$ | —NH— | Sel. |
| I | 5.2 | 0.4 | 13. | 5.3 | 0.4 | 13.2 |
| II | 5.8 | 0.2 | 29 | 4.7 | 0.2 | 23.5 |
| III | 5.1 | 0.4 | 12.7 | 4.3 | 0.6 | 7.2 |

A - Temp 250° F–300° F; LHSV 1.4
B - Temp 300° F–350° F; LHSV 3.0

From the above table, it will be apparent that at the lower temperature of operation, "A", the control III gave only 5.1 parts of desired primary amine while the experimental examples I–II yielded 5.2 and 5.8 parts. Comparable, but even more favorable results are noted at the higher temperature conditions of "B".

It is also apparent that the content of less desirable secondary amine decreases substantially from the control to the experimental; and as may be noted, it may drop to one third of that of the control.

The selectivity (i.e. the ratio of parts by weight of desired primary amine to parts of weight of less desired secondary amine) also may, in the experimental examples, be as much as three or more times that attained in the control example.

From this table it is thus clear that not only may these improved productivities and selectivities be achieved, but also that they may be attained by use of a catalyst which contains only about 10% as much chloride. One skilled in the art would regard it as an unobvious improvement if he were able to gain the same results by use of a catalyst containing less chloride. The catalyst of control Example III is typical of prior art catalysts with respect to chloride content.

EXAMPLES IV–IX

Results comparable to those of Examples I–II may be achieved if the charge nitrated hydrocarbon is as set forth in the following table:

| Example | Charge | Product |
|---|---|---|
| IV | 2-nitro hexane | 2-aminohexane |
| V | 2-nitro octane | 2-aminooctane |
| VI | 6-nitro dodecane | 6-amino dodecane |
| VII | dodecanone-2-oxime | 2-amino dodecane |
| VIII | octanone-3,4-di-oxime | 3,4-diamino-octane |
| IX | 3-nitro-dodecene-5 | 3-amino-dodecane |

Although this invention has been illustrated by reference to specific embodiments, it will be apparent to those skilled in the art that various changes and modifications may be made which clearly fall within the scope of this invention.

We claim:

1. The method of preparing an amine by hydrogenating a corresponding charge nitrated hydrocarbon which comprises hydrogenating said charge at hydrogenation conditions including hydrogenation temperature of 100°–450° F in the presence of a catalyst prepared by leaching a high ash carbon in contact with a hydrohalic acid thereby forming a reduced ash carbon containing halide values;

leaching said reduced ash carbon in contact with a solution containing at least one composition selected from the group consisting of water-soluble organic carboxylic acids and ammonium salts thereof thereby forming a reduced ash carbon containing decreased halide values; and depositing palladium on said reduced ash carbon containing decreased halide values thereby forming the catalyst;

thereby forming a product stream containing hydrogenated product; and recovering said product stream containing said hydrogenated product.

2. The method of preparing an amine as claimed in claim 1 wherein said hydrocarbon is a $C_6$–$C_{25}$ hydrocarbon.

3. The method of preparing an amine as claimed in claim 1 wherein said hydrocarbon is a $C_{10}$–$C_{17}$ hydrocarbon.

4. The method of preparing an amine as claimed in claim 1 wherein said hydrogenation temperature is 200°–300° F.

5. The method of preparing an amine as claimed in claim 1 wherein said hydrogenation is carried out at 10–300 atmospheres.

6. The method of preparing an amine as claimed in claim 1 wherein said hydrogenation is carried out in the presence of diluent hydrocarbon.

7. The method of preparing an amine as claimed in claim 1 wherein the halide content of the pelletted carbon prior to loading with palladium, is 0.01–0.5%.

8. The method of preparing an amine as claimed in claim 1 wherein the total ash content of the pelletted carbon prior to loading with palladium, is 0.05–0.1%.

9. The method of preparing an amine as claimed in claim 1 wherein said charge contains a nitroparaffin.

10. The method of preparing an amine as claimed in claim 1 wherein said charge contains an oxime.

11. The method of preparing an amine as claimed in claim 1 wherein said charge contains a nitro-olefin.

12. The method which comprises
leaching a high ash carbon in contact with a hydrohalic acid thereby forming a reduced ash carbon containing halide values;
leaching said reduced ash carbon in contact with a solution containing at least one composition selected from the group consisting of water-soluble organic carboxylic acids and ammonium salts thereof thereby forming a reduced ash carbon containing decreased halide values;
depositing palladium on said reduced ash carbon containing decreased halide values thereby forming the catalyst;
hydrogenating a charge nitrated hydrocarbon at hydrogenation conditions including hydrogenation temperature of 100°–460° F in the presence of said catalyst thereby forming a product stream containing hydrogenated product; and
recovering said hydrogenated stream containing said hydrogenated product.

13. The method of preparing a primary amine of a $C_6$–$C_{25}$ hydrocarbon by hydrogenating a corresponding charge nitrated $C_6$–$C_{25}$ hydrocarbon which comprises
hydrogenating said charge $C_6$–$C_{25}$ nitrated hydrocarbon at hydrogenation conditions including hydrogenation temperature of 100°–450° F and hydrogenation pressure of 10–300 atmospheres in the presence of, as catalyst a pelletted carbon having an ash content of less than about 0.1% and a halide content of less than about 0.5% and bearing 0.2–5% of palladium deposited thereon, said catalyst having been prepared by
leaching a high ash carbon in contact with an aqueous solution containing hydrofluoric acid thereby forming a reduced ash carbon containing halide values;
leaching said reduced ash carbon containing halide values in contact with an aqueous solution containing acetic acid thereby forming a reduced ash carbon containing decreased halide values; and
depositing palladium metal on said reduced ash carbon containing decreased halide values;
thereby forming a product stream containing hydrogenated product; and
recovering said product stream containing said hydrogenated product.

14. The method of preparing a primary amine of a $C_6$–$C_{25}$ hydrocarbon by hydrogenating a corresponding charge nitrated $C_6$–$C_{25}$ hydrocarbon which comprises
hydrogenating said charge $C_6$–$C_{25}$ nitrated hydrocarbon at hydrogenation conditions including hydrogenation temperature of 100°–450° F and hydrogenation pressure of 10–300 atmospheres in the presence of, as catalyst a pelletted carbon having an ash content of less than about 0.1% and a halide content of less than about 0.5% and bearing 0.2–5% of palladium deposited thereon, said catalyst having been prepared by
leaching a high ash carbon in contact with an aqueous solution containing hydrochloric acid thereby forming a reduced ash carbon containing chloride values; leaching said reduced ash carbon containing chloride values with an aqueous solution containing hydrofluoric acid thereby forming a reduced ash carbon containing fluoride values; leaching said reduced ash carbon containing fluoride values in contact with an aqueous solution containing acetic acid thereby forming a reduced ash carbon containing decreased halide values; and
depositing palladium metal on said reduced ash carbon containing decreased halide values;
thereby forming a product stream containing hydrogenated product; and
recovering said product stream containing said hydrogenated product.

* * * * *